United States Patent
Karajgikar et al.

(10) Patent No.: US 11,409,716 B2
(45) Date of Patent: Aug. 9, 2022

(54) FILE CONFLICT DETECTION

(71) Applicant: Citrix Systems, Inc., Fort Lauderdale, FL (US)

(72) Inventors: Nishant Jaywant Karajgikar, Raleigh, NC (US); Ajay Kumar, Raleigh, NC (US); Jason Yanchuleff, Raleigh, NC (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 357 days.

(21) Appl. No.: 16/262,496

(22) Filed: Jan. 30, 2019

(65) Prior Publication Data
US 2020/0242089 A1   Jul. 30, 2020

(51) Int. Cl.
*G06F 16/00*   (2019.01)
*G06F 16/18*   (2019.01)
*G06F 16/176*  (2019.01)

(52) U.S. Cl.
CPC ........ *G06F 16/1873* (2019.01); *G06F 16/176* (2019.01)

(58) Field of Classification Search
CPC .................................................. G06F 16/176
See application file for complete search history.

(56) References Cited

U.S. PATENT DOCUMENTS

| | | | |
|---|---|---|---|
| 8,856,256 B1 * | 10/2014 | Srinivasan | G06Q 10/107 709/206 |
| 2005/0289512 A1 | 12/2005 | Matsusaka | |
| 2011/0282850 A1 | 11/2011 | Kamra et al. | |
| 2015/0324386 A1 * | 11/2015 | Calder | H04L 69/08 707/649 |
| 2020/0183887 A1 * | 6/2020 | Zhuang | G06F 16/122 |

FOREIGN PATENT DOCUMENTS

EP    0278312 A2   8/1988

OTHER PUBLICATIONS

May 4, 2020—(WO) International Search Report and Written Opinion—App PCT/US2020/015316.

* cited by examiner

*Primary Examiner* — Ajith Jacob
(74) *Attorney, Agent, or Firm* — Banner & Witcoff, Ltd.

(57) ABSTRACT

Methods and systems for shared file conflict detection on a computing device are described herein. A computing device may store a shared file that may be accessed by a variety of other computing devices. An operating system executing on one or more computing devices may generate file handles corresponding to file operations associated with the shared file. One or more of the computing devices may receive, from a remote computing device, a request for a file operation associated with the shared file. A notification corresponding to file handles associated with the shared file may be transmitted to a user. The request for the file operation may be implemented or rejected based on file handles associated with the shared file, the file operation, and/or whether the file operation may cause an application to crash or cause data corruption.

22 Claims, 7 Drawing Sheets

FILE CONFLICT DETECTION

FIELD

Aspects described herein generally relate to computers and computer networks. In particular, aspects described herein relate to file systems, operating systems, reading, writing, and storing data, storage area networks, versioning, and computer networking.

BACKGROUND

Improvements in computer networking have made it increasingly attractive to share access to a single file across multiple computing devices. For example, employees at a company may share and edit a single document stored on a centralized server. Versioning and revision control systems, such as the SUVERSION system by the Apache Software Foundation of Forest Hill, Md., may allow such employees to track edits to the file over time. For example, a user of a versioning and revision control program may tag a file as open on a system, make edits to that file, and tag the file as released for other users' edits/access. Some version control programs allow users to simultaneously edit particular types of files. For example, the GOOGLE DOCS system by Google LLC of Mountain View, Calif. provides users the ability to access and edit the same document in real-time, but only provides support for office suite documents, such as spreadsheets and text documents.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the art, and to overcome other limitations that will be apparent upon reading and understanding the present specification, aspects described herein are directed towards editing of and conflict detection associated with a shared file. A host computing device, such as a server, may store a shared file that may be accessed by a plurality of computing devices. For example, a text document may be stored on the host computing device, and users may, using the same or different computing devices, be capable of reading, editing, and/or deleting the text document. The host computing device may execute an operating system which, when the shared file is accessed by the host computing device or another computing device, creates file handles corresponding to the access. For example, a file handle may be created when the shared file is opened or written to by the host computing device. The creation and/or existence of such file handles may be monitored. For example, the host computing device and/or other computing devices may determine, using the operating system executing on the host computing device, file handles for a given file, which may thereby indicate whether the file is being accessed and/or likely to be edited. The host computing device may receive a file operation for a shared file (e.g., a request for a file operation, such as an edit to the shared file) from a computing device. The file operation may be to edit the shared file by, for example, replacing a first version of the shared file with a second version of the shared file, and/or may be to add and/or remove one or more portions of the shared file. The host computing device and/or other computing devices may compare a version of the shared file associated with the request to edit the shared file with the shared file. For example, the file operation request may comprise adding a line to the end of a file, and the host computing device may compare versions of the shared file with and without the line. The host computing device may transmit a notification corresponding to the file handle and/or file operation to one or more computing devices, and/or may approve or reject the file operation.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards files as stored in a networked environment wherein files may be stored at and transmitted between computing devices, such as a server and local computing devices. Storage of such files may comprise determining versions and/or revisions of such files. Current versioning and revision control programs are often inconvenient and unreliable. Versioning and revision control programs may be abstracted away from the file system, meaning that, for example, a program not configured to use the versioning and revision control program may inadvertently edit and/or delete a program when it is open by another user. Additionally, because versioning and revision control systems generally require that users' computing devices indicate that they are accessing a file, some users may find that versioning and revision control systems are inconvenient and/or difficult to use. While plug-ins to existing programs (e.g., office suite) programs lower the effort required by a user to use such programs, these plug-ins are occasionally unreliable. Worse still, versioning and revision control programs can be unreliable, meaning that, for example, two users might accidentally edit the same file and cause the file to become corrupt.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
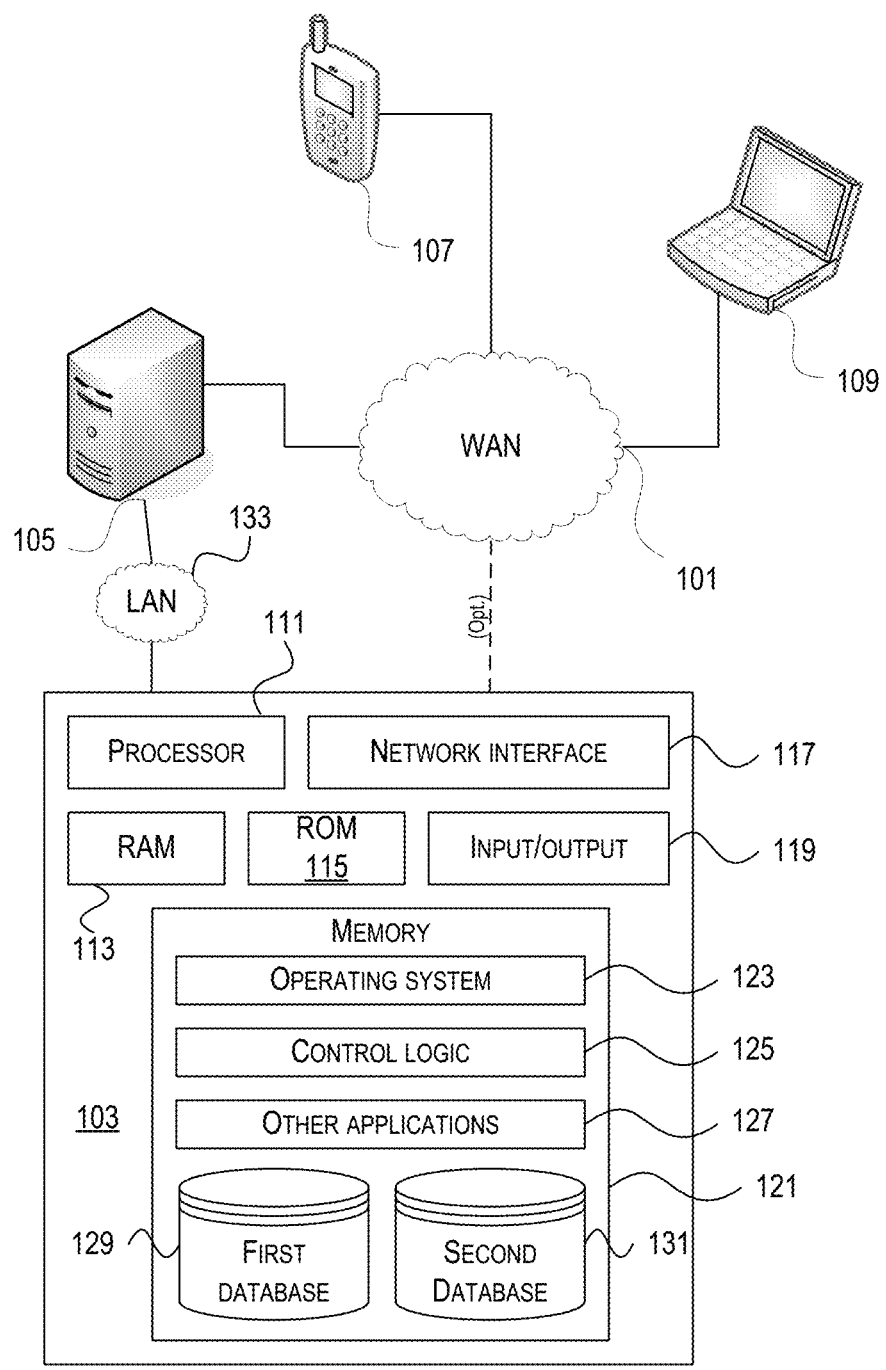
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
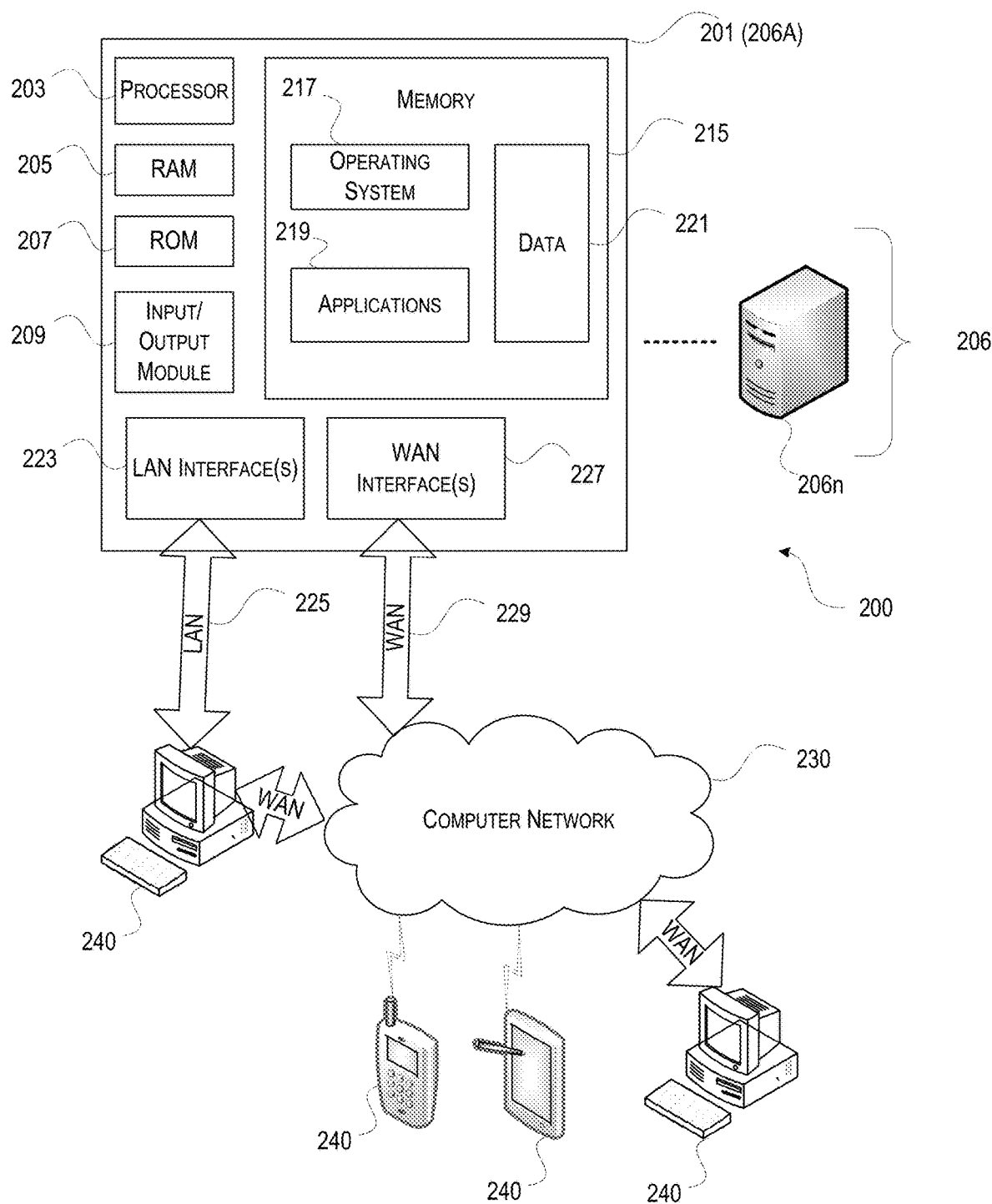
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Shared File Conflict Detection

Figure 3:
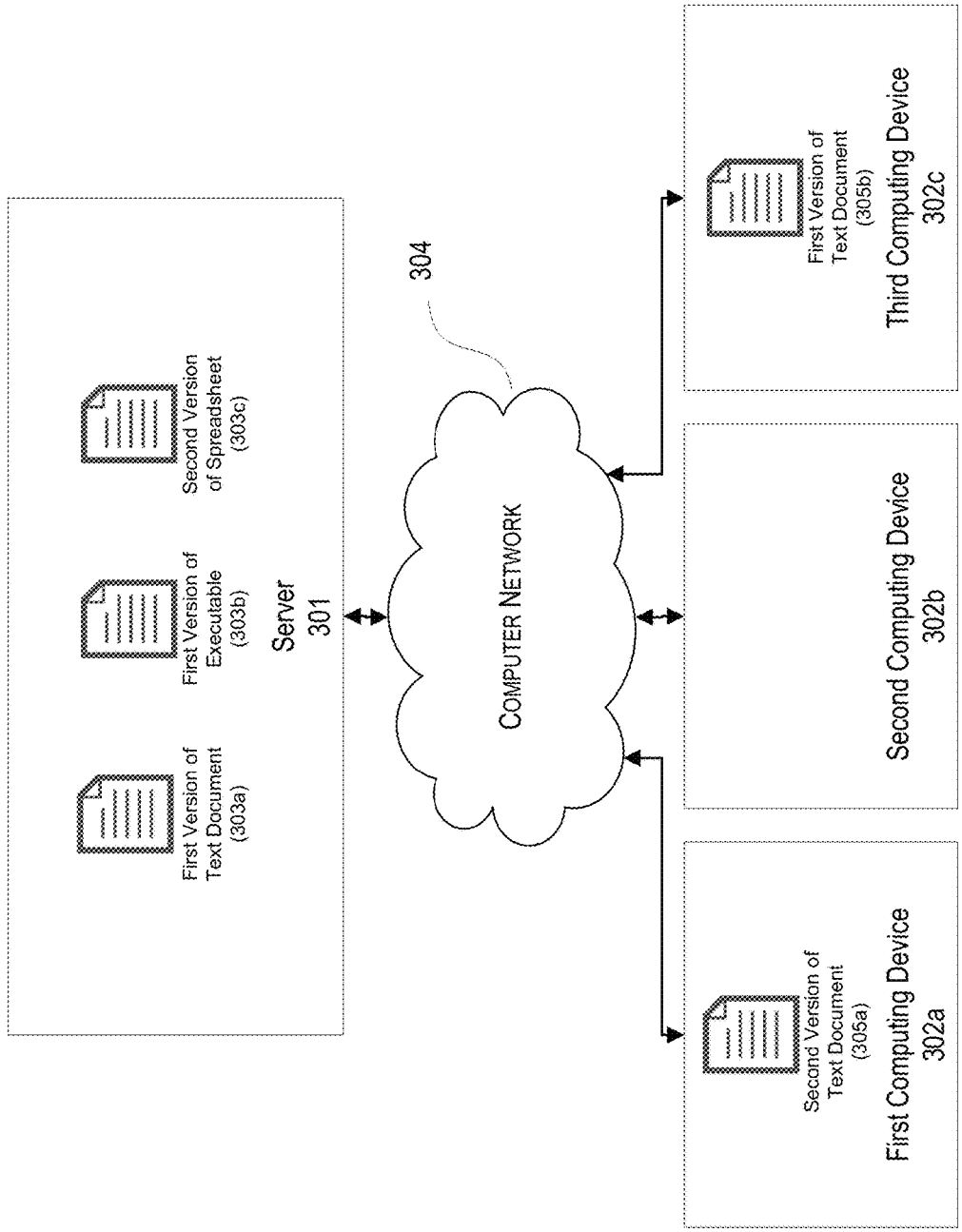
FIG. 3 depicts an illustrative architecture depicting a server with a shared file and multiple local computing devices.

FIG. 3 depicts an illustrative network architecture with a server 301 storing shared files. The server 301 may be connected, via a computer network 304, to a first computing device 302a, a second computing device 302b, and a third computing device 302c. The computer network 304 may be the same or similar to the computer network 230. The server 301, first computing device 302a, second computing device 302b, and third computing device 302c may all be or execute on computing devices, such as the computing device 201. The server 301 may store shared files. For example, the server 301 stores a first version of a text document 303a, a first version of an executable 303b, and a second version of a spreadsheet 330c. The first computing device 302a is shown as storing a second version of the text document 305a, and the third computing device 302c is shown as storing a first version of the text document 305b. The second version of the text document 305a may be a modified version of the first version of the text document 303a. For example, the second version of the text document 305a may have fewer lines as compared to the first version of the text document 303a. The first version of the text document 305b and the first version of the text document 303a may be the same. Though the files are referred to as versions, the files need not be explicitly designated as versions: for example, the second version of the spreadsheet 303c may be different from a prior version only in that it is somehow different than a version of the spreadsheet previously stored on the server 301.

The server 301 and/or one or more computing devices (e.g., the first computing device 302a) may be configured to store shared files, such as the first version of the text document 303a. The files may be stored in accordance with any file system, such as the File Allocation Table (FAT) architecture. Some files on the server may be shared, e.g., via the computer network 304, with other computing devices, such as the first computing device 302a. For example, the first version of the text document 303a may be shared with the second computing device 302b by placing the first version of the text document 303a in a shared folder and/or by tagging the file with an indication that it is available for sharing. A file need not be modified or maintained in a special format in order to be shared. The server 301 may be configured to perform other operations with respect to the files, such as editing the files.

The server 301 and/or one or more computing devices (e.g., the first computing device 302a) may be configured with an operating system that manages file handles corresponding to files. A file handle may be any indicator that all or portions of a file are being or have been accessed, e.g., by a process executing on the server 301 and/or on another computing device. Such file handles may comprise, for example, operating system primitives. For example, a file handle may be created when a user opens the second version of the spreadsheet 303c in an application and/or queries the operating system for file properties associated with the second version of the spreadsheet 303c. A file handle may indicate one or more actions being taken with respect to a file. For example, a file handle may indicate that a file is being only read, that a file is currently being written to or may be written to, that a file has been closed, or other similar file operations. A file handle may correspond to a time or period of time, e.g., such that a file handle may indicate when a file was opened.

File handles may be created by computing devices accessing a file. Such file handles may comprise an indication that a file is in use. For example, access to the second version of the spreadsheet 330c by the second computing device 302b may cause creation of a file handle at the second computing device 302b and/or a file handle at the server 301. In a cloud computing environment, notifications corresponding to such access may be generated, and file handles may be generated based on these notifications. For example, computing devices in a cloud computing environment may execute software which provides other computing devices periodic notifications of shared file activity. The file handles may be accessible by computers other than the server 301. For example, the first computing device 302a may be configured to send and/or receive a list of file handles from the server 301, and/or the server 301 may be configured to transmit indications of file handles from a first set of computing devices to a different set of computing devices.

Computing devices, such as the server 301, may be configured to monitor and associate access to files with users. A user may be associated with a process executing on the server 301 and/or on another computing device, and the server 301 may, using the file handle and the association, associate the user with access to a particular file. For example, the server 301 may maintain a table correlating usernames (e.g., usernames used to access the computer network 304) with file handles and/or particular files. This association may be performed in part by the operating system executing on the server.

Computing devices may also be configured to store and/or perform operations with respect to files. For example, the third computing device 302c may download a copy of the first version of the text document 303a from the server 301 and store it (e.g., as the first version of the text document 305b). Such downloading may occur before the file is edited. As another example, the first computing device 302a may download and edit a copy of a file, such as how the second version of the text document 305a may be an edited version of the first version of the text document 303a as stored on the server 301.

Computing devices, such as the first computing device 302a, may be configured to retrieve, edit, and transmit documents to the server 301. For example, a user may, using an application executing on the second computing device 302b, access the second version of the spreadsheet 303c. This may cause one or more of the computing devices (e.g., the server 301, the second computing device 302b, or the like, including a combination thereof) to create one or more file handle corresponding to the access. The second computing device 302b may, for example, receive an indication of the file handle. The user of the second computing device 302b may edit the second version of the spreadsheet 303c, creating a third version of the spreadsheet. The user may then press a "save" button on the application, causing the application to transmit the third version of the spreadsheet to the server. This may cause the one or more of the computing devices (e.g., the server 301, the second computing device 302b, or the like, including a combination thereof) to create a second file handle corresponding to the third version of the spreadsheet, and/or to edit an existing file handle. This action may simultaneously cause detection of a possible conflict scenario with respect to the file, and, as detailed below, the user may be presented with options such as discarding their changes, discarding changes associated with a different computing device (and/or overwriting a copy of the file, e.g., as stored on the server 301), and/or downloading a copy of the file associated with the other computing device for comparison. This process may be the same or similar to that of file operations performed on files stored at the second computing device 302b. In other words, based on a file handle being associated with a file on a server, and based on a user attempting to make a conflicting edit with respect to such a file, the user may be presented with a variety of options to handle the conflicting edit.

Figure 4:
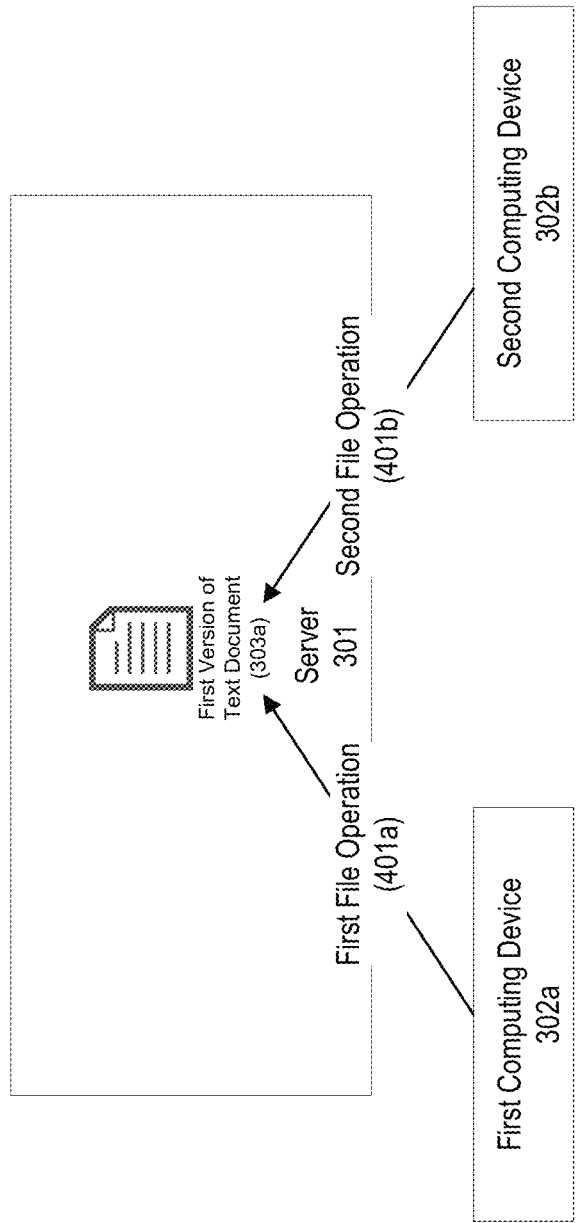
FIG. 4 depicts an illustrative architecture involving a file conflict.

FIG. 4 depicts a simplified version of FIG. 3, including the server 301, the first computing device 302a, the second computing device 302b, and the first version of the text document 303a. A file operation conflict is shown. First file operation 401a and second file operation 401b are shown accessing the first version of the text document 303a at the same time. The two file operations need not be at the same time; however, for the purposes of simplicity, the two file operations are depicted as occurring simultaneously. In this circumstance, a possibility that the first version of the text document 303a may become corrupt and/or that one or more file operations may be ignored exists. For example, if the first file operation 401a and the second file operation 401b affect the same portion(s) of the first version of the text document 303a, an attempt to perform edits at the same time may cause one or more file operations to be ignored, one or more applications to crash, errors to be introduced to the file, and/or the file to become corrupt.

Figure 5:
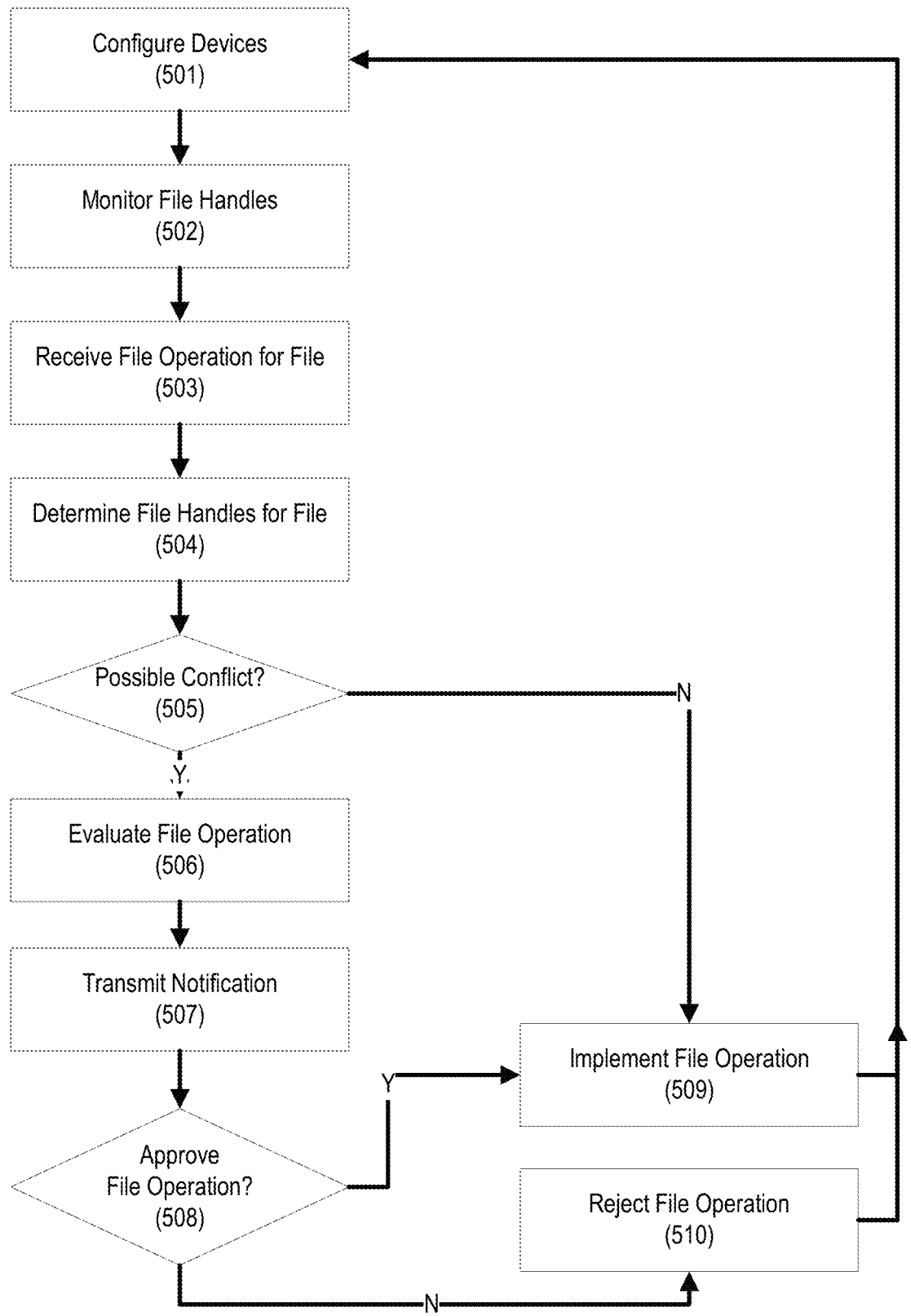
FIG. 5 is a flow chart which may be performed with respect to shared files.

FIG. 5 shows a flow chart which may be performed by a computing device, such as the server 301 and/or other computing devices (e.g., the first computing device 302a). In step 501, devices such as the server 301 and/or other computing devices may be configured. An operating system may be installed and executed which causes file handles to be generated based on file operations. One or more computing devices may be provided remote access to files. Users authorized to access such files may be determined. One or more rules for which files may be shared may be determined. For example, a folder may be created wherein files in the folder are automatically shared to computing devices on a network.

In step 502, file handles may be monitored. An operating system may be configured to generate file handles corresponding to file operations associated with a shared file, and a list of the file handles may be determined and/or stored. The file handles may be associated with one or more users of one or more computing devices, including but not limited to the host of the shared file subject to the file operation(s). The file handles may be associated with one or more files. The file handles may be associated with one or more file operations, such as reading operations, writing operations, deletion operations, or the like. Any computing device may receive the file handles, such that the computing device creating the file handles need not be the only computing device with information about such file handles. For example, a computing device may query the server 301 for a list of file handles.

In step 503, a file operation for a shared file may be received from a computing device. The computing device may be the same or a different computing device as the computing device storing the file. For example, a computing device may edit its own spreadsheet, or a remote computing device may transmit a file operation for the same spreadsheet. The file operation may be received over a network. The file operation may comprise, for example, an indication of one or more portions of the shared file to be added, removed, and/or modified. For example, a file operation request for an edit to a spreadsheet may increase the value of a first cell, delete values in a second cell, and insert values into a formerly empty cell. The file operation may be received as a request, e.g., for an edit to the shared file, and/or may be received as a request to replace a currently-stored shared file with a new version of the shared file.

File operations received may be logged, whether or not the file operations are ultimately granted. The log of file operations may comprise an indication as to whether or not the file operation was granted. This log may be used to determine if, for example, one or more processes undesirably monopolize one or more files.

In step 504, file handles may be determined for the shared file corresponding to the file operation. One or more file handles may exist for a given shared file. Some file handles may indicate that the shared file may be edited freely. For example, a file handle may indicate that a shared file has been closed by another user, meaning that another user may edit the shared file. Some file handles may indicate that the shared file is in use or may be edited. For example, a file handle may indicate that a shared file is being edited, read, and/or was recently edited and/or read. Multiple file handles for the same shared file may exist. For example, multiple users may be opening the same shared file at the same time. File handles for a file may be received by a computing device along with receipt of a file. For example, the first computing device 302*a* may receive, from the server 301, a copy of the first version of the text document 303*a* along with a list of file handles associated with the first version of the text document 303*a*.

In step 505, based on the file handles, it is determined whether a possible conflict exists. A possible conflict may exist where the file operation in step 503 conflicts with activity indicated by the file handles determined in step 504, such that the shared file appears to be in-use. For example, if a first user is editing a document, allowing a second user to edit the same document may cause a conflict. Two users editing the same shared file need not always indicate a conflict: for example, a first user may edit a first line of a shared file, whereas a second user may edit a fifth line of the same shared file without conflicting with the first user. As another example, if a first user is reading a shared file, allowing a second user to delete the same shared file may cause a conflict. The file handles may not definitively indicate whether file operations are being performed with respect to a shared file. For example, a file handle may indicate that a user recently opened a shared file, but not indicate whether it is likely that the user will soon save an edited version of the shared file. As such, the likelihood of a possible conflict (e.g., a particular percentage likelihood that a shared file will be edited during a particular time period) may be determined in step 505. If there is a possible conflict, the flow chart proceeds to step 506. Otherwise, the flow chart proceeds to step 508.

In step 506, the file operation is evaluated. A second version of the shared file may be generated based on the requested file operation, and the second version of the shared file may be compared to the original version of the shared file. For example, the file operation may be tagged as minimal if it involves adding content, whereas a file operation may be tagged as significant if it involves deleting content. As another example, a percentage of change to the shared file may be determined.

A second version of the shared file may be generated based on the requested file operation, and it may be determined whether the second version of the shared file is corrupted or likely to become corrupted. For example, the second version of the shared file may be executed or otherwise opened (e.g. in an application executing in a sandboxed environment in the operating system) to determine if the second version of the shared file is associated with one or more errors. Based on executing or otherwise opening the second version of the shared file, a potential corruption metric may be determined. The potential corruption metric may be, for example, a percentage of a file which may not be read by a particular application. As another example, the potential corruption metric may be a number of errors. As yet another example, the potential corruption metric may be a Boolean value of whether or not one or more applications in a sandboxed environment crashed after the second version of the shared file was opened. If the potential corruption metric exceeds a predetermined threshold (e.g., one error, more than five percent of the file being unreadable, or the like), the second version of the shared file may be determined to be corrupt.

The second version of the shared file may be evaluated against a standard to determine whether the second version of the shared file deviates from the standard. For example, the second version of the shared file may be an Extensible Markup Language (XML) file, and the second version of the shared file may be evaluated to determine whether all or portions of it deviate from XML conventions. The file operation may be evaluated by determining whether the file operation may cause one or more applications to crash. For example, the shared file may be a dependency for an executing application, such that edits to the shared file while the application is executing may cause one or more processes associated with the application to crash.

In step 507, a notification corresponding to the file handles and/or file operation may be transmitted. The notification may be configured to notify a user, e.g., a user associated with the file operation, of the possible conflict determined in step 505. The notification may comprise information about the file handles and/or the file operation, such as an indication that a possible conflict may exist, when the shared file was last accessed (e.g., by one or more users different than the user associated with the requested file operation), and similar contextual information. The notification may provide the user with one or more options associated with the file operation. For example, a notification transmitted by a server may be configured to allow the recipient of the notification to make a copy of the shared file stored on the server, to save the edited version of the shared file as a new shared file, to discard the edited version of the shared file, to attempt to forcibly overwrite the copy of the shared file stored on the server, to send a message to another user associated with a file handle, or the like. The notification may enable a user to negotiate access to the shared file with another user. For example, the notification may allow a user to limit the remaining time which a second user has to access and/or edit the shared file. The notification may be transmitted over a network and, e.g., as a push notification.

In step 508, it is determined whether the file operation should be approved. Whether the file operation may be approved may be based on the file handles determined in step 504. For example, if a different user recently opened the shared file and is likely to edit it, the file operation may be denied because the file operation may conflict with the user's access to the shared file. The nature of the file operation may also influence whether the file operation should be approved. For example, a minimal edit to a text file may be permissible despite a conflict because the likelihood of the minimal edit conflicting with other activity involving the file may be small, and/or because the other user(s) currently accessing the shared file may re-access the shared file without interruption. As a contrasting example, a significant edit (e.g., deleting more than a predetermined portion of a shared file) may be impermissible because it may be highly likely to interfere with other users' access to the file. The approval of the file operation may be based on the response to a notification transmitted in step 507. For example, if the user elects to save the edited file as a new file, then the file operation may be rejected because the edits will be preserved in a different shared file. As another example, if the user is associated with elevated account permissions, the user may be allowed to make file operations despite other users accessing the shared file. If the file operation is approved, the flow chart proceeds to step 509. Otherwise, the flow chart proceeds to step 510.

In step 509, based on no possible conflict existing or the approval of the file operation, the file operation may be implemented. Implementing the file operation may comprise replacing a shared file with a new version of the shared file, making one or more changes to a shared file, and/or deleting all or portions of a shared file. Implementing the file operation may comprise transmitting, to another computing device, instructions to implement the file operation. Implementing the file operation may comprise preventing access to the shared file by other computing devices. Preventing access to the file may comprise closing currently open file handles associated with the shared file. For example, the computing device storing the shared file may force close all processes associated with open file handles corresponding to the shared file. Implementing the file operation may comprise waiting until one or more file handles associated with the shared file are closed. For example, the file operation may not be implemented until all other users have ended access to their copies of the shared file. The flow chart may then return to step 501.

In step 510, the file operation may be rejected. Rejecting the file operation may comprise discarding data transmitted corresponding to the file operation. For example, a computing device may transmit a new version of a shared file to be saved by a server, and the server may delete the new version of the file. Rejecting the file operation may comprise transmitting, to a user associated with the requested file operation, a second notification. The second notification may, for example, indicate one or more reasons why the file operation was rejected.

Whether implemented in step 509 or rejected in step 510, file operations may be tracked. File operation tracking may be used to determine, for example, a number of times a particular shared file has been edited or otherwise accessed by computing devices. Such tracking may be used to, for example, change a location of a shared file (e.g., to move popular shared files closer to users such that they might be accessed faster, and/or to move less popular shared files away from users to preserve storage space). File operation tracking may also be used to enforce service-level agreements relating to a maximum number of times one or more users may access a shared file. For example, based on determining that a number of times that a user has edited a shared file exceeds a predetermined amount, future file operations may be automatically rejected.

Figure 6:
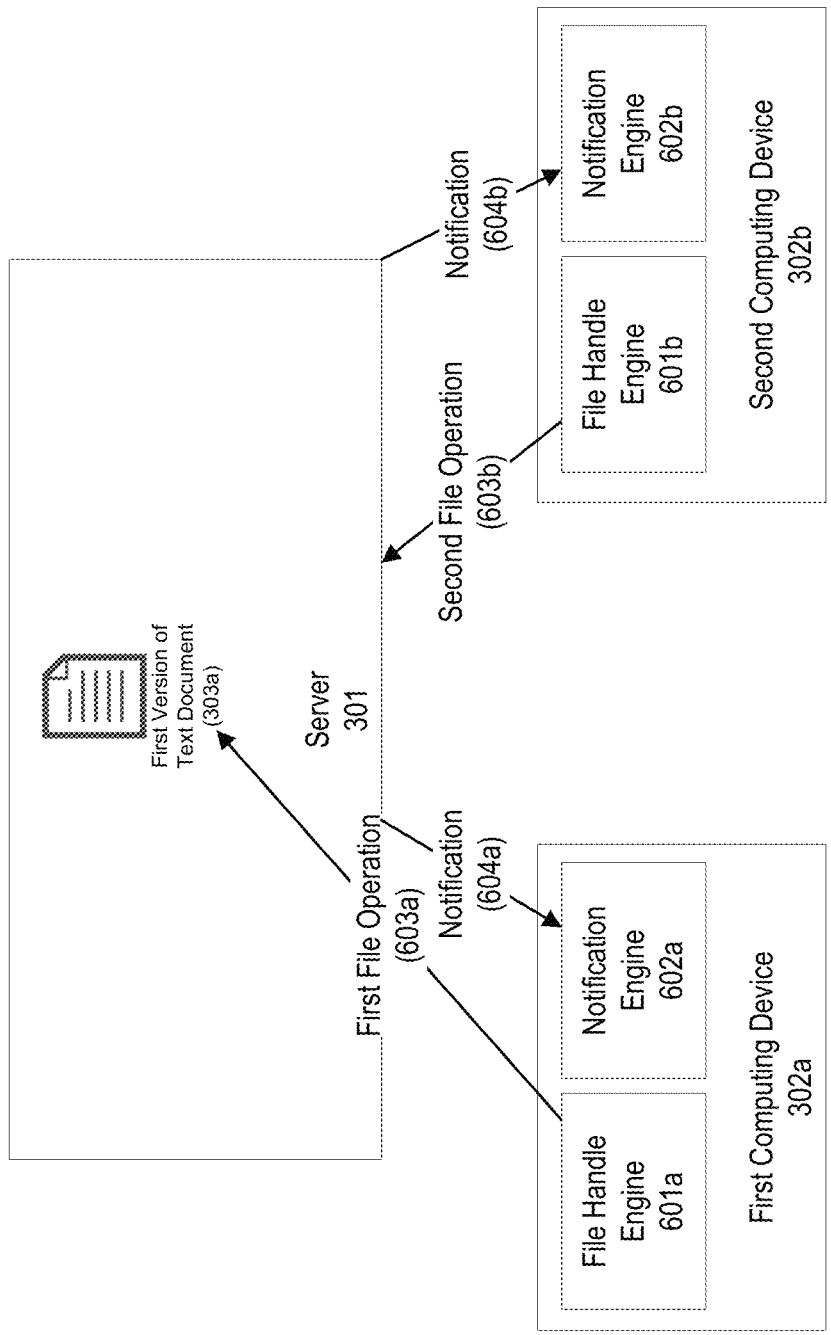
FIG. 6 depicts an illustrative network architecture involving a file handle engine.

FIG. 6 depicts an illustrative network architecture similar to that of FIG. 4 and in view of the steps in FIG. 5. The server 301, the first computing device 302*a*, the second computing device 302*b*, and the first version of the text document 303*a* have not changed from FIG. 3 and FIG. 4. The first computing device 302*a* has a file handle engine 601 and a notification engine 602*a*. The second computing device 302*b* has a file handle engine 602*b* and a notification engine 602*b*. Similar to the circumstance depicted in FIG. 4, a first file operation 603*a* and second file operation 603*b* are received by the server 301. The first file operation 603*a* may be determined based on the file handle engine 601*a*, and the second file operation 603*b* may be determined based on the file handle engine 601*b*. For example, the file handle engine 601*a* may be configured to receive operating system file handles from the server 301. Based on the steps depicted in FIG. 5, the first file operation 603*a* is implemented, as reflected by the arrow extending to the first version of the text document 303*a*. The first file operation 603*a* may be executed before the second file operation 603*b* because it arrived sooner than the second file operation 603*b* or based on one or more rules for prioritizing file operations. For example, the server 301 may be configured to prioritize simpler file operations over more significant file operations, earlier file operations over later file operations, or the like. In response to receiving the second file operation 603*b* from the second computing device 302*b*, the server 301 transmits, to the second computing device 302*b*, a notification 604*b*, which may be displayed by the notification engine 602*b*. A notification 604*a* may be transmitted to the first computing device 302*a* as well. The notification may indicate that, for example, the second file operation 603*b* will not be implemented until the first file operation 603*a* has been completed. Though only the first file operation 603*a* is depicted as implemented at the first version of the text document 303*a*, the server 301 may later cause the second file operation 603*b* to be implemented as well. For example, the server 301 may wait a predetermined period of time, and then implement the second file operation 603*b* on the first version of the text document 303*a*.

Figure 7:
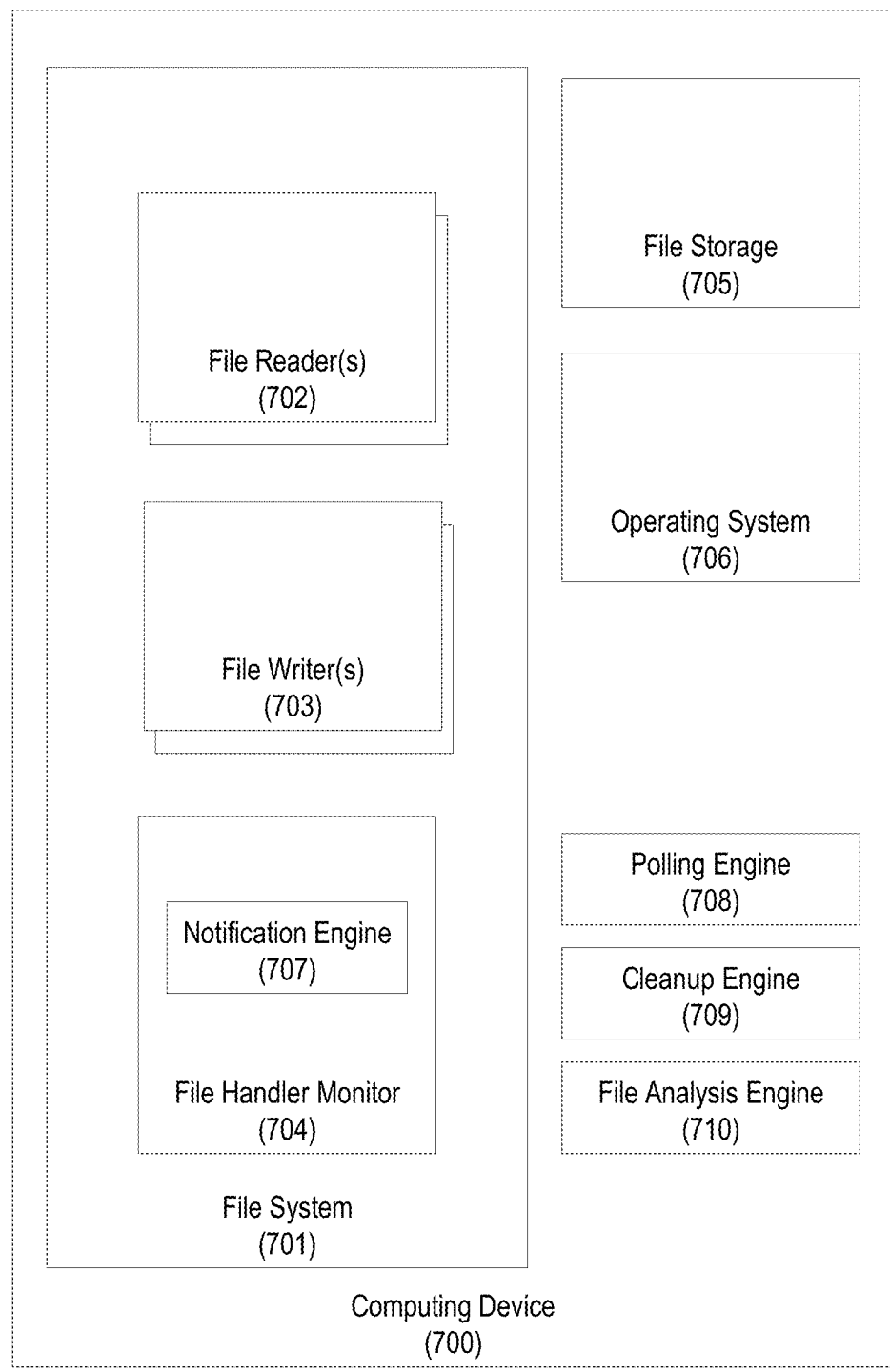
FIG. 7 depicts an illustrative structure of a computing device which may perform the steps described herein.

FIG. 7 depicts an example configuration of a computing device which may perform the steps depicted in FIG. 5. A computing device 700, which may be the same or similar to the server 301, may have a file system 701 comprising file readers 702, file writers 703, and a file handler monitor 704. The computing device may also have file storage 705, an operating system 706, a polling engine 708, a cleanup engine 709, and a file analysis engine 710. The file handler monitor 704 may be associated with a notification engine 707.

The file storage 705 may store files, which may be read by the file readers 702 and may be written to by the file writers 703. The file readers 702 and the file writers 703 may perform file operations requested by processes executing on the computing device 700 or via remote computing devices. Such file operations may cause the operating system 706 to create file handles, which may be monitored by the file handler monitor 704. The file handler monitor 704 may be configured to transmit, e.g., to another computing device, indications of file handles. The polling engine 708 may be used to poll other computing devices regarding file operations of files in the file storage 705. For example, the polling engine 708 may be configured to periodically query a remote computing device as to whether the remote computing device is still reading/editing a file downloaded from the file storage 705. The cleanup engine 709 may be configured to perform file optimization and organization tasks with respect to the file storage 705, such as organizing files, deleting files, and the like. The file analysis engine may be configured to analyze files, e.g., files stored in the file storage 705, to determine whether or not the files are corrupt (e.g., by testing the files using a potential corruption metric) and/or whether the files comply with a standard.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   storing, by a first computing device, a shared file, wherein the shared file is accessible by a plurality of computing devices;
   determining, based on an operating system file handle associated with the shared file, that the shared file is being accessed;
   receiving, from a second computing device, a request to edit the shared file;
   preventing, by the first computing device and based on the operating system file handle, the edit to the shared file; and
   sending, to the second computing device and based on the request, a notification corresponding to the operating system file handle;
   receiving a response to the notification;
   determining, based on the request, a second version of the shared file;
   comparing the shared file and the second version of the shared file; and
   generating, based on the comparing, the response, and the edit, a new shared file.

2. The method of claim 1, wherein generating the new shared file is further based on determining whether a potential corruption metric meets a predetermined threshold.

3. The method of claim 1, wherein the notification enables the second computing device to create a copy of the shared file.

4. The method of claim 1, wherein the notification enables the second computing device to create a new version of the shared file.

5. The method of claim 1, wherein the operating system file handle is associated with access, by a third computing device, to the shared file.

6. The method of claim 5, further comprising:
   preventing, by the first computing device and based on the request to edit the shared file, further access to the shared file by the third computing device.

7. The method of claim 1, wherein an operating system executing on the first computing device is configured to generate operating system file handles based on access to shared files.

8. A method comprising:
   storing, by a first computing device, a first version of a shared file, wherein the shared file is accessible by a plurality of computing devices;
   accessing, by the first computing device, the first version of the shared file, wherein an operating system executing on the first computing device is configured to generate, based on the accessing, an operating system file handle;
   receiving, from a second computing device, a second version of the shared file;
   comparing the first version of the shared file and the second version of the shared file; and
   replacing, based on the operating system file handle and the comparing, the first version of the shared file with the second version of the shared file.

9. The method of claim 8, wherein the replacing the first version of the shared file with the second version of the shared file is further based on:
   causing the second version of the shared file to be opened in a sandboxed environment.

10. The method of claim 8, wherein the replacing the first version of the shared file with the second version of the shared file is further based on determining whether a potential corruption metric meets a predetermined threshold.

11. The method of claim 8, further comprising:
    transmitting, to the second computing device, a notification corresponding to the operating system file handle.

12. The method of claim 8, wherein replacing the shared file with the second version of the shared file comprises:
    determining that the operating system file handle has been closed.

13. The method of claim 8, further comprising:
    preventing further access to the shared file by the first computing device.

14. A first computing device comprising:
    one or more processors; and
    memory storing instructions that, when executed by the one or more processors, cause the first computing device to:
      store a shared file, wherein the shared file is accessible by a plurality of computing devices;
      determine, based on an operating system file handle associated with the shared file, that the shared file is being accessed;
      receive, from a second computing device, a request to edit the shared file;
      prevent, based on the operating system file handle, the edit to the shared file;
      send, to the second computing device and based on the request, a notification corresponding to the operating system file handle;
      receive a response to the notification;
      determine, based on the request, a second version of the shared file;
      compare the shared tile and the second version of the shared file; and
      generate, based on the comparing, the response, and the edit, a new shared tile.

15. The first computing device of claim 14, wherein the instructions, when executed by the one or more processors, cause the first computing device to generate the new shared file based on determining whether a potential corruption metric meets a predetermined threshold.

16. The first computing device of claim 14, wherein the notification enables the second computing device to create a copy of the shared file.

17. One or more non-transitory computer-readable media storing instructions that, when executed by one or more processors, cause a first computing device to:
    store a shared file, wherein the shared file is accessible by a plurality of computing devices;
    determine, based on an operating system file handle associated with the shared file, that the shared file is being accessed;
    receive, from a second computing device, a request to edit the shared file;
    prevent, based on the operating system file handle, the edit to the shared file;
    send, to the second computing device and based on the request, a notification corresponding to the operating system file handle;
    receive a response to the notification;
    determine, based on the request, a second version of the shared file;
    compare the shared file and the second version of the shared file; and generate, based on the comparing, the response, and the edit, a new shared file.

18. The non-transitory computer-readable media of claim 17, wherein the instructions, when executed by the one or more processors, cause the first computing device to generate the new shared file based on determining whether a potential corruption metric meets a predetermined threshold.

19. The non-transitory computer-readable media of claim 17, wherein the notification enables the second computing device to create a copy of the shared file.

20. A system comprising:
a server; and
a computing device,
wherein the server comprises:
one or more first processors; and
first memory storing first instructions that, when executed by the one or more first processors, cause the server to:
store a shared file, wherein the shared file is accessible by a plurality of computing devices;
determine, based on an operating system file handle associated with the shared file, that the shared file is being accessed;
receive, from the computing device, a request to edit the shared file;
prevent, based on the operating system file handle, the edit to the shared file;
send, to the computing device and based on the request, a notification corresponding to the operating system file handle;
receive a response to the notification;
determine, based on the request, a second version of the shared file;
compare the shared file and the second version of the shared file; and
generate, based on the comparing, the response, and the edit, a new shared file and
wherein the computing device comprises:
one or more second processors; and
second memory storing second instructions that, when executed by the one or more second processors, cause the computing device to:
send, to the server, the request to edit the shared file; and
receive, from the server, the notification.

21. The system of claim 20, wherein the first instructions, when executed by the one or more first processors, cause the server to perform the edit to the shared file based on determining whether a potential corruption metric meets a predetermined threshold.

22. The system of claim 20, wherein the notification enables the computing device to create a copy of the shared file.

* * * * *